UNITED STATES PATENT OFFICE.

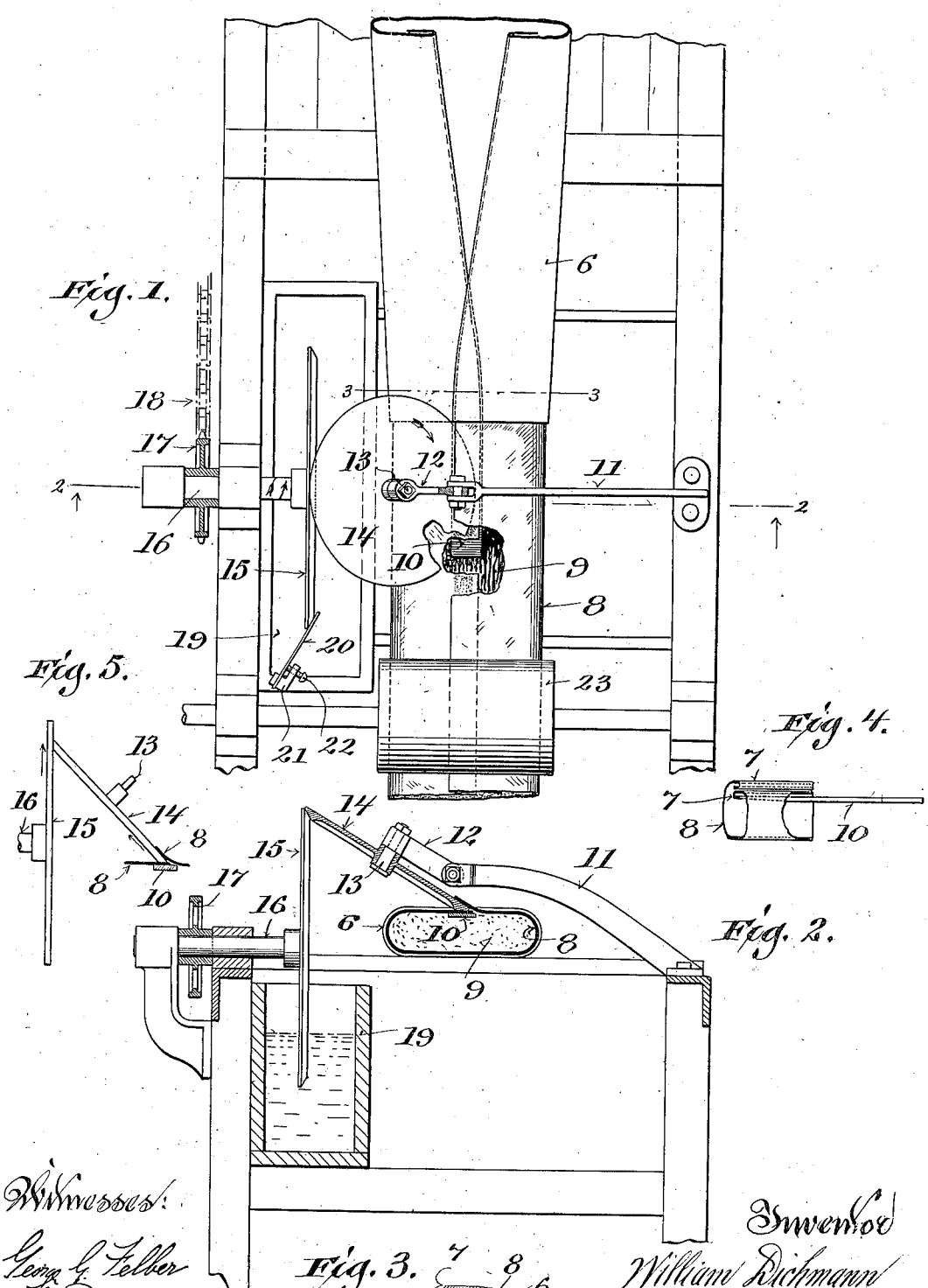

WILLIAM DICHMANN, OF OSHKOSH, WISCONSIN.

PAD-MAKING MACHINE.

987,440.

Specification of Letters Patent. Patented Mar. 21, 1911.

Application filed December 20, 1910. Serial No. 598,440.

*To all whom it may concern:*

Be it known that I, WILLIAM DICHMANN, a citizen of the United States, and resident of Oshkosh, in the county of Winnebago and State of Wisconsin, have invented certain new and useful Improvements in Pad-Making Machines; and I do hereby declare that the following is a full, clear, and exact description thereof.

My invention consists in what is herein particularly set forth with reference to the accompanying drawings and pointed out in claims, its object being to provide pad-making machines with simple, economical means for even distribution of glue to the lap-seams of continuously formed paper envelops containing a filling of marsh grass or other resilient material, the combined envelop-shaper and pad-former in each machine being similar, in a general way, to the one in the pad-making machine disclosed in Patent No. 855,235, issued to me May 28, 1907.

Figure 1 of the drawings represents a plan view of a portion of a pad-making machine partly in horizontal section and equipped with means for distributing glue as aforesaid in accordance with my invention; Fig. 2, a transverse section of the same indicated by line 2—2 in Fig. 1; Fig. 3, a similar view on the plane indicated by line 3—3 in said Fig. 1; Fig. 4, a partly broken side elevation of a fragment of the combined envelop-shaper and pad-former aforesaid provided at its discharge-end with an outwardly projecting paper-support, and Fig. 5, a rear elevation of glue-distributing disks in the machine at a different angle to one another than is shown in Fig. 2.

Referring by numerals to the drawings, 6 indicates an inclined envelop-shaper and pad-forming trough supported upon the frame of a pad-making machine. Like in the patent aforesaid, the edges of the trough are inturned to form ways 7 at each side, the same extending the entire length of the device to guide and shape the web of paper from which the envelop 8 is made upon its contents 9, said trough being tapered and open at the top for the greater portion of its length.

At the discharge-end of the trough one of its paper guide-ways 7 laps the other as in said patent, and said trough is herein shown provided with a paper-support in the form of a horizontal flat tongue 10 that extends from said end of same on a plane below the innermost guideway.

Mounted on the machine-frame is a stationary bracket 11, and pivotally connected to the bracket is a hanger 12 for an arbor 13 of a loose bevel-edge disk 14, that rotates in the seam of the envelop aforesaid, when in working-position against another disk 15 fast on a driven arbor 16 for which said frame is provided with bearings, the disk 14 being driven as a result of its frictional contact with the other disk. Any suitable means may be employed to drive the arbor 16 having the disk 15 fast thereon, said arbor being herein shown as provided with a sprocket-wheel 17 engaging a suitably driven link-belt 18.

The disk 15 rotates in a rectangular glue-pot 19 supported in connection with the machine-frame, and opposing said disk is a spring scraper-blade 20 connected to a holder 21 mounted on the upper edge of said pot, tension of the scraper-blade being regulated by a screw 22 with which the holder is provided. The scraper governs the amount of glue elevated by the disk 15 to the disk 14 by which it is fed in the seam of the envelop 8 over the support 10, said seam being closed by the draw-rolls of the machine one of these rolls 23 being herein shown. To discontinue feed of the glue to the disk 14, this disk is swung back out of contact with the disk 15. In Fig. 2, the disk 14 is shown as taking glue from the correspondingly beveled edge of the disk 15, but as shown in Fig. 5, it may take the glue from a side of the other disk as may be found most desirable in practice.

I claim:

1. In a pad-making machine, a combined envelop-shaper and pad-forming trough provided at its discharge-end with an outwardly projecting paper-support, a bevel-edge disk arranged to rotate in the pad-seam over said support, and another disk that rotates in a glue-pot and has frictional contact with the disk aforesaid, one of said disks being run as a driver for the other.

2. In a pad-making machine, a combined envelop-shaper and pad-forming trough provided at its discharge-end with an outwardly projecting paper-support, a bevel-edge disk arranged to rotate in the pad-seam over said support, another disk that rotates in a glue-pot and has frictional contact with the disk aforesaid, one of said disks being run as a driver for the other, and a scraper arranged to oppose the glue-elevating disk above the contents of said pot.

3. In a pad-making machine, a combined envelop-shaper and pad-forming trough provided at its discharge-end with an outwardly projecting paper-support, a bevel-edge disk arranged to rotate in the pad-seam over said support, another disk that rotates in a glue-pot and has frictional contact with the disk aforesaid, one of said disks being run as a driver for the other, a spring-blade scraper arranged to oppose the glue-elevating disk above the contents of said pot, and means for regulating the tension of the scraper.

4. In a pad-making machine, a combined envelop-shaper and pad-forming trough provided at its discharge-end with an outwardly projecting paper-support, a disk fast on a driven arbor and rotative in a glue-pot, a hanger in pivotal connection with said bracket, and a bevel-edge disk loose on an arbor in connection with the hanger, this disk being rotative in the pad-seam when in working position against the other disk by which it is driven.

5. In a pad-making machine, a combined envelop-shaper and pad-forming trough provided at its discharge-end with an outwardly projecting paper support, a disk fast on a driven arbor and rotative in a glue-pot, a scraper for said disk above the contents of said pot, a hanger in pivotal connection with a stationary support, and a bevel-edge disk loose on an arbor in connection with the hanger, this disk being rotative in the pad-seam when in working position against the other disk by which it is driven.

In testimony that I claim the foregoing I have hereunto set my hand at Oshkosh in the county of Winnebago and State of Wisconsin in the presence of two witnesses.

WILLIAM DICHMANN.

Witnesses:
 A. H. GRUENEWALD,
 CHRIS PEDERSEN.